United States Patent
Lee et al.

(10) Patent No.: US 11,745,729 B2
(45) Date of Patent: Sep. 5, 2023

(54) PARKING GUIDANCE SYSTEM AND METHOD

(71) Applicants: HYUNDAI MOTOR COMPANY, Seoul (KR); Kia Corporation, Seoul (KR)

(72) Inventors: Sang Hyu Lee, Incheon (KR); Young Chae Ahn, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/526,319

(22) Filed: Nov. 15, 2021

(65) Prior Publication Data

US 2022/0363244 A1 Nov. 17, 2022

(30) Foreign Application Priority Data

May 17, 2021 (KR) .................. 10-2021-0063641

(51) Int. Cl.
| | |
|---|---|
| G08G 1/14 | (2006.01) |
| B60W 30/06 | (2006.01) |
| G05D 1/02 | (2020.01) |
| G08G 1/017 | (2006.01) |
| G06V 20/10 | (2022.01) |

(52) U.S. Cl.
CPC ........... *B60W 30/06* (2013.01); *G05D 1/0234* (2013.01); *G06V 20/10* (2022.01); *G08G 1/017* (2013.01); *G08G 1/142* (2013.01); *B60W 2300/145* (2013.01); *G05D 2201/0213* (2013.01); *G06V 2201/08* (2022.01)

(58) Field of Classification Search
CPC ........... B60W 30/06; B60W 2300/145; G05D 1/0234; G05D 2201/0213; G06V 20/10; G06V 2201/08; G06V 20/52; G06V 20/586; G06V 20/62; G08G 1/017; G08G 1/142; G08G 1/148; G08G 1/165; G08G 1/166; H04N 7/18
USPC ...................... 340/932.2, 933, 937, 988, 990
See application file for complete search history.

(56) References Cited

U.S. PATENT DOCUMENTS

| | | | |
|---|---|---|---|
| 10,822,030 B2 * | 11/2020 | Lee ...................... | G05D 1/0088 |
| 2009/0309710 A1 * | 12/2009 | Kakinami ............ | G06V 10/145 |
| | | | 348/148 |
| 2018/0362026 A1 * | 12/2018 | Heimberger ........... | B62D 13/06 |
| 2020/0160713 A1 * | 5/2020 | Obayashi ............... | G01C 21/34 |
| 2020/0290601 A1 * | 9/2020 | Yamanaka ............ | B60W 10/20 |
| 2020/0307616 A1 * | 10/2020 | Nithiyanantham ........................ |
| | | | G02B 27/0101 |
| 2021/0086757 A1 * | 3/2021 | Sugano ............ | G08G 1/096816 |

* cited by examiner

*Primary Examiner* — Anh V La
(74) *Attorney, Agent, or Firm* — MORGAN, LEWIS & BOCKIUS LLP

(57) ABSTRACT

A parking guidance system includes a parking guidance device that sets a position of a parking area in a distribution hub and generates a travel path to the parking area and an autonomous vehicle that controls movement of the autonomous vehicle to the position of the parking area set by the parking guidance device.

19 Claims, 7 Drawing Sheets

PARKING GUIDANCE SYSTEM AND METHOD

CROSS-REFERENCE TO RELATED APPLICATION

This application claims the benefit of priority to Korean Patent Application No. 10-2021-0063641, filed on May 17, 2021 in the Korean Intellectual Property Office, the entire contents of which are incorporated herein by reference.

TECHNICAL FIELD

The present disclosure relates to a parking guidance system and method.

BACKGROUND

Freight is transported via a distribution hub (a distribution center) for smooth distribution, and a large truck or a tractor truck having a trailer connected thereto is usually used to carry a large amount of freight.

In general, a large truck or a tractor truck is parked in communication with a parking attendant to load or unload freight after entering a distribution hub. In the case of an autonomous truck, a driver does not get in the autonomous truck, and therefore more accurate control is required to park the autonomous truck.

SUMMARY

The present disclosure has been made to solve the above-mentioned problems in the background section while advantages mentioned in the background section are maintained intact.

An aspect of the present disclosure provides a parking guidance system and method for supporting automatic parking of an autonomous truck entering a distribution hub.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a parking guidance system includes a parking guidance device that sets a position of a parking area in a distribution hub and generates a travel path to the parking area and an autonomous vehicle that controls movement of the autonomous vehicle to the position of the parking area set by the parking guidance device.

The parking guidance device may include a camera that obtains information about the autonomous vehicle, a communication device that transmits at least one of the position of the parking area or the travel path to the parking area to the autonomous vehicle, a light output device that generates an image capable of being identified as the parking area, on a ground corresponding to the position of the parking area, and a controller that links the autonomous vehicle and the position of the parking area to each other.

The autonomous vehicle may include a communication device that receives the position of the parking area from the parking guidance device and a controller that recognizes the image capable of being identified as the parking area and controls the autonomous vehicle to be parked in the parking area.

The autonomous vehicle may include at least one of a tractor truck or a trailer connected with the tractor truck.

The travel path to the parking area may include at least one of a travel path of the trailer or a travel path of the tractor truck generated based on the travel path of the trailer.

The autonomous vehicle may receive the position of the parking area from the parking guidance device and may search for a travel path to the parking area based on the position of the parking area received.

The autonomous vehicle may compare the travel path received from the parking guidance device and the travel path searched based on the position of the parking area and may determine whether a difference between the received travel path and the searched travel path exceeds a reference value.

The autonomous vehicle may request a travel path to the parking area again, upon determining that the difference exceeds the reference value.

The autonomous vehicle may control the movement to the parking area based on the received travel path, upon determining that the difference does not exceed the reference value.

The autonomous vehicle may request a travel path to the parking area again, when an obstacle is detected during the control of the movement to the position of the parking area based on the received travel path.

According to another aspect of the present disclosure, a parking guidance method includes setting, by a parking guidance device, a position of a parking area in a distribution hub and generating a travel path to the parking area, and controlling movement of an autonomous vehicle to the position of the parking area.

Prior to the generating of the travel path, the parking guidance method may further include obtaining information about the autonomous vehicle, determining the position of the parking area and linking the autonomous vehicle and the position of the parking area to each other, and generating an image capable of being identified as the parking area, on a ground corresponding to the position of the parking area.

After the generating of the travel path, the parking guidance method may further include transmitting at least one of the position of the parking area or the travel path to the parking area to the autonomous vehicle.

The autonomous vehicle may include at least one of a tractor truck or a trailer connected with the tractor truck.

The generating of the travel path to the parking area may include generating a travel path of the trailer and generating a travel path of the tractor truck based on the travel path of the trailer.

The parking guidance method may further include receiving, by the autonomous vehicle, the position of the parking area and searching for a travel path to the parking area based on the position of the parking area.

The parking guidance method may further include comparing, by the autonomous vehicle, the travel path received from the parking guidance device and the travel path searched based on the position of the parking area and determining whether a difference between the received travel path and the searched travel path exceeds a reference value.

The parking guidance method may further include requesting a travel path to the parking area from the parking guidance device again, upon determining that the difference exceeds the reference value.

The parking guidance method may further include controlling movement to the parking area based on the received travel path, upon determining that the difference does not exceed the reference value.

The controlling of the movement of the autonomous vehicle to the position of the parking area may include recognizing the image capable of being identified as the parking area and controlling the autonomous vehicle to move to the position of the parking area.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
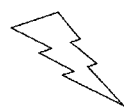
FIG. 1 is a view illustrating a configuration of a parking guidance system according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of a parking guidance system according to an exemplary embodiment of the present disclosure.

As illustrated in FIG. 1, the parking guidance system 100 according to the embodiment of the present disclosure may include a vehicle 110 and a parking guidance device 120.

The vehicle 110 may receive and recognize the position of a parking area generated by the parking guidance device 120 and may control movement to the parking area. Here, the vehicle 110 may include at least one of a tractor truck or a trailer connected with the tractor truck. And the vehicle may include autonomous vehicle. A more detailed description of the vehicle 110 will be given below with reference to FIG. 2.

The parking guidance device 120 may set a parking area in a distribution hub and may generate a travel path to the parking area. Here, the parking area may refer to an area where the vehicle 110 is stopped to load or unload freight. The parking area may be defined by a parking line painted on the ground. According to an embodiment, the parking area may be defined by an image generated by light (a light beam) that the parking guidance device 120 outputs. Here, the image may include an image capable of being identified as the parking area. A more detailed description thereabout will be given below with reference to FIG. 3.

Figure 2:
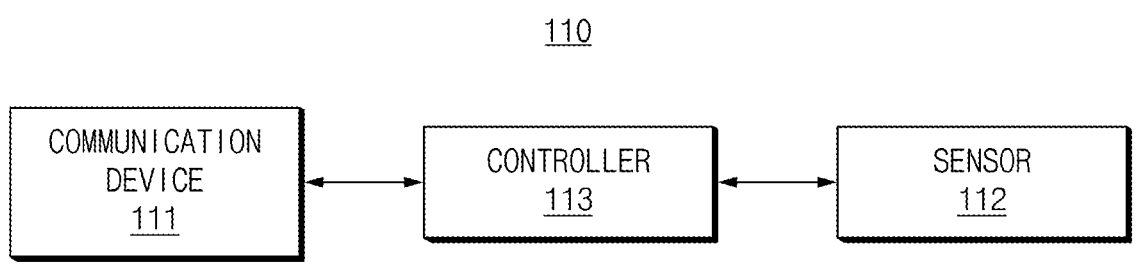
FIG. 2 is a view illustrating a configuration of a vehicle according to an exemplary embodiment of the present disclosure.

FIG. 2 is a view illustrating a configuration of the vehicle according to an exemplary embodiment of the present disclosure.

As illustrated in FIG. 2, the vehicle 110 may include a communication device 111, a sensor 112, and a controller 113.

The communication device 111 may communicate with the parking guidance device 120 through various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. According to an embodiment, the communication device 111 may transmit, to the parking guidance device 120, a message to request the position of a parking area in a distribution hub that the vehicle 110 enters and may receive, from the parking guidance device 120, the position of the parking area generated by the parking guidance device 120.

The sensor 112 may include an image sensor that obtains an image of an area ahead of the vehicle 110 and a radar and/or a LiDAR that detects an obstacle ahead of the vehicle 110. Here, the obstacle may include an object that obstructs travel of the vehicle 110. According to an embodiment, the image sensor may obtain an image of a parking area ahead of the vehicle 110.

The controller 113 may be implemented by various processing devices such as a microprocessor having a semiconductor chip embedded therein for performing operation or execution of various commands and may control overall operation of the vehicle 110 according to the embodiment of the present disclosure.

The controller 113 may search for a travel path of the vehicle 110 to the position of the parking area received from the parking guidance device 120. In addition, the controller 113 may compare a travel path of the vehicle 110 received from the parking guidance device 120 and a found travel path and may determine whether the difference between the received travel path and the found travel path exceeds a reference value.

According to an exemplary embodiment of the present disclosure, the controller 113 may express the travel path of the vehicle 110 received from the parking guidance device 120 and the found travel path as Equation 1 and Equation 2 that are multi-dimensional equations.

$$y = a1x^2 + b1y + c1 \qquad \text{<Equation 1>}$$

Here, a1 is a curvature of a road, b1 is a heading angle between the road and the vehicle, and c1 is a distance between a reference point of the vehicle and the received path.

$$y = a2x^2 + b2y + c2 \qquad \text{<Equation 2>}$$

Here, a2 is a curvature of a road, b2 is a heading angle between the road and the vehicle, and c2 is a distance between a reference point of the vehicle and the found path.

According to an embodiment, the controller 113 may determine whether the difference between c1 in Equation 1 and c2 in Equation 2 exceeds the reference value.

When it is determined that the difference between the received travel path and the found travel path exceeds the reference value, the controller 113 may determine that there is an error in the travel path generated by the parking guidance device 120 and may request a travel path from the parking guidance device 120 again. In contrast, when it is determined that the difference between the received travel path and the found travel path does not exceed the reference value, the controller 113 may control movement to the parking area, based on the received travel path. When the vehicle 110 moves to the parking area based on the received travel path, the controller 113 may determine whether interference with another vehicle or an obstacle exists ahead of the vehicle 110.

When it is determined that the interference with the other vehicle or the obstacle exists ahead of the vehicle 110 when the vehicle 110 moves to the parking area based on the received travel path, the controller 113 may determine that there is an error in the travel path generated by the parking guidance device 120 and may request a travel path from the parking guidance device 120 again. In contrast, when there is no obstacle or no interference with another vehicle, the controller 113 may cause the vehicle 110 to move along the received travel path.

The controller 113 may determine whether the parking area is recognized while the vehicle 110 moves along the received travel path. A more detailed description thereabout will be given below with reference to FIG. 3.

Figure 3:
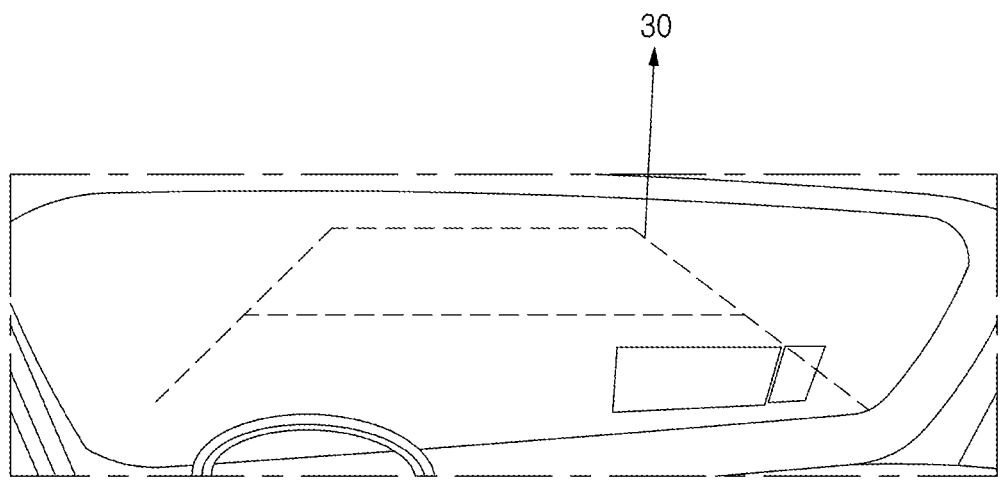
FIG. 3 is a schematic view illustrating a parking area recognized by the vehicle according to an exemplary embodiment of the present disclosure.

FIG. 3 is a schematic view illustrating a parking area recognized by the vehicle according to an exemplary embodiment of the present disclosure.

Figure 4:
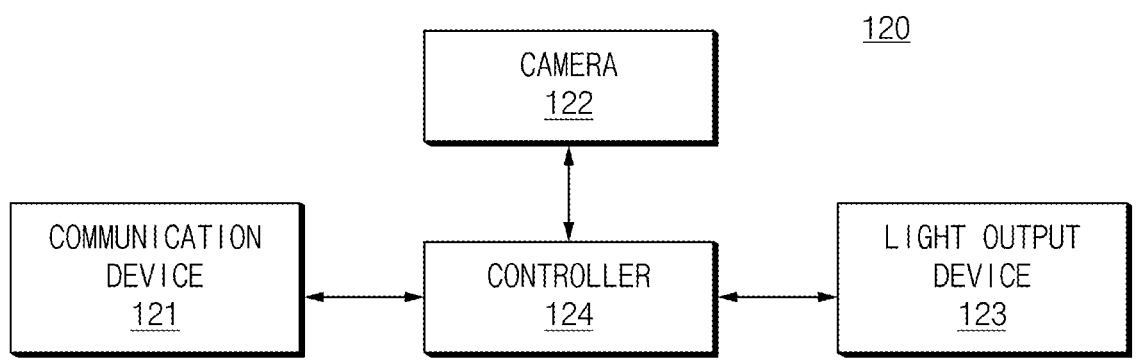
FIG. 4 is a view illustrating a configuration of a parking guidance device according to an exemplary embodiment of the present disclosure.

According to an exemplary embodiment of the present disclosure, as illustrated in FIG. 3, the controller 113 may recognize an image 30 generated on the ground (e.g., an image generated on the ground by light output from a light output device 123 of FIG. 4). The image 30 may include a parking line defining a parking area and may include a foam capable of being identified as the parking area.

When the controller 113 fails to recognize the image 30, which is generated to identify the parking area, during travel of the vehicle 110 along a received travel path, the controller 113 may determine that there is an error in the travel path generated by the parking guidance device 120 and may request a travel path from the parking guidance device 120 again. When the controller 113 recognizes the image 30 generated to identify the parking area, the controller 113 may perform parking control such that the vehicle 110 is parked in the parking area, and when the vehicle 110 is completely parked in the parking area, the controller 113 may transmit vehicle state data to the parking guidance device 120.

FIG. 4 is a view illustrating a configuration of the parking guidance device according to an exemplary embodiment of the present disclosure.

As illustrated in FIG. 4, the parking guidance device 120 according to the embodiment of the present disclosure may include a communication device 121, a camera 122, the light output device 123, and a controller 124. According to an exemplary embodiment of the present disclosure, the components of the parking guidance device 120 may transmit and receive information through wireless communication or wired communication.

The communication device 121 may communicate with the vehicle 110 through various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. According to an exemplary embodiment of the present disclosure, the communication device 121 may receive a message to request the position of a parking area in a distribution hub that the vehicle 110 enters, may transmit at least one of the position of the parking area or a travel path to the parking area to the vehicle 110, and may receive a message to request a travel path again from the vehicle 110.

The camera 122 may obtain information about the vehicle 110 entering the distribution hub. Here, the information may include the number of the vehicle 110. To easily obtain the information about the vehicle 110 entering the distribution hub, the camera 122 may be provided above the approach to the distribution hub.

The light output device 123 may output light (a light beam) to the ground corresponding to the position of the parking area determined by the controller 124 and may generate an image capable of being identified as the parking area where the vehicle 110 has to be stopped to load or unload freight. According to an embodiment of the present disclosure, the light output device 123 may generate a parking area image capable of being identified as the parking area. However, without being limited thereto, the light output device 123 may generate any type of image capable of being identified as the parking area.

The controller 124 may be implemented by various processing devices such as a microprocessor having a semiconductor chip embedded therein for performing operation or execution of various commands and may control overall operation of the parking guidance device 120 according to the embodiment of the present disclosure.

The controller 124 may determine that the vehicle 110 enters the distribution hub, based on an image obtained by the camera 122, and when the vehicle 110 enters the distribution hub and the controller 124 receives a message to request the position of a parking area from the vehicle 110, the controller 124 may match vehicle information obtained by the camera 122 and the position coordinates of the vehicle 110. According to an exemplary embodiment of the present disclosure, the position coordinates of the vehicle 110 may be generated based on virtual grid lines in the distribution hub. A detailed description thereabout will be given below with reference to FIG. 5.

Figure 5:
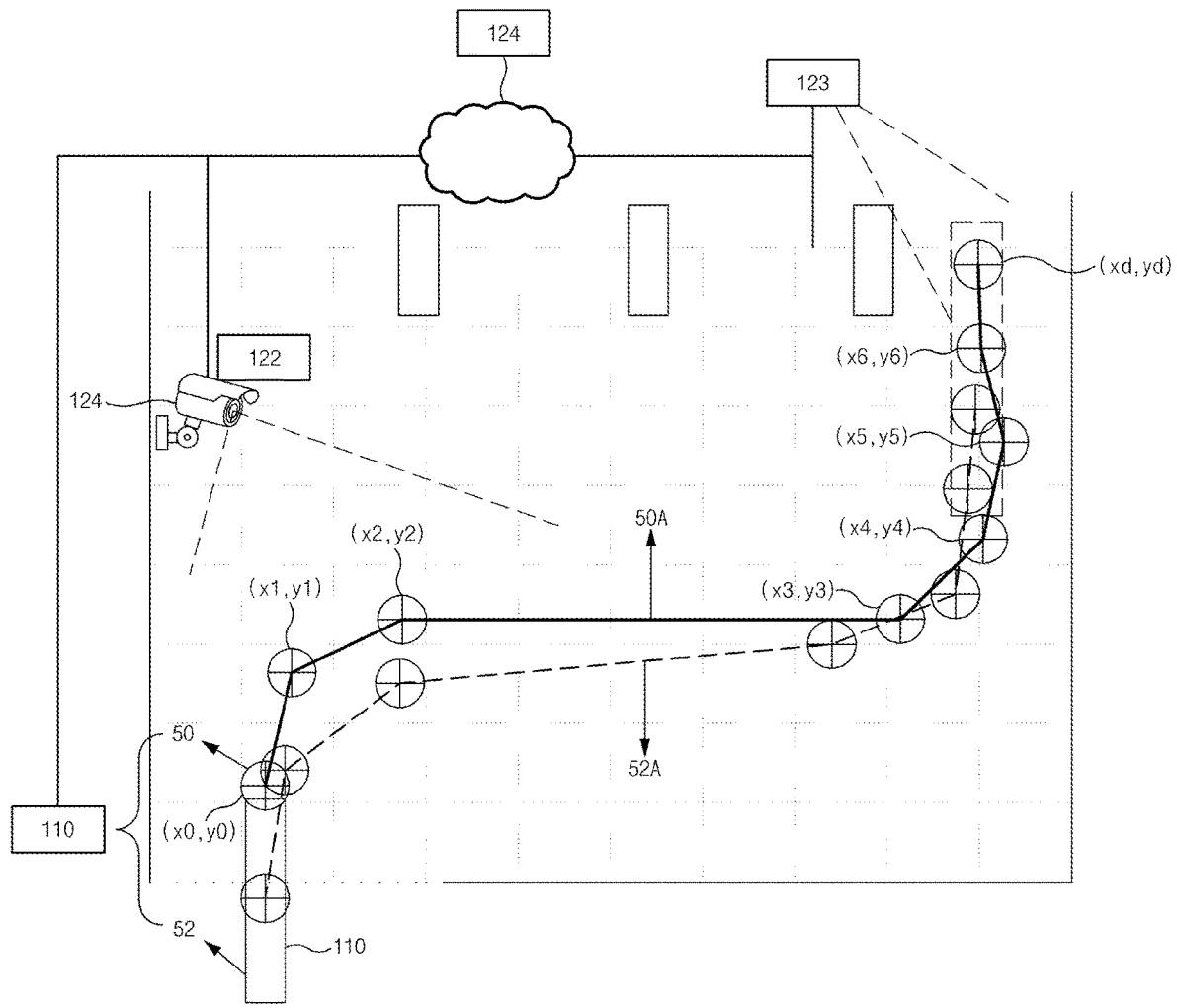
FIG. 5 is a schematic view illustrating position coordinates depending on vehicle movement according to an exemplary embodiment of the present disclosure.

FIG. 5 is a schematic view illustrating position coordinates depending on vehicle movement according to an exemplary embodiment of the present disclosure.

As illustrated in FIG. 5, the controller 124 may set virtual grid lines in a distribution hub and may generate position coordinates of the vehicle 110 matching vehicle information obtained by the camera 122 and position coordinates of a parking area, based on the virtual grid lines. According to an embodiment, the controller 124 may generate the position coordinates of the vehicle 110 (e.g., a tractor truck) obtained by the camera 122 as (x0, y0) and may generate the position coordinates of the parking area of the vehicle 110 as (xd, yd).

The controller 124 may link the position coordinates (x0, y0) of the vehicle 110 and the position coordinates (xd, yd) of the parking area and may control the light output device 123 to output light (a light beam) to the position corresponding to the position coordinates (xd, yd) of the parking area linked with the vehicle 110 and generate an image capable of being identified as the parking area. Accordingly, the controller 124 may allow the parking area of the vehicle 110 obtained by the camera 122 in the distribution hub to be identified in the position corresponding to the position coordinates (xd, yd) of the parking area.

The controller 124 may generate a travel path from the position coordinates of the vehicle 110 to the position coordinates of the parking area. According to an exemplary embodiment of the present disclosure, the controller 124 may generate a travel path 52A of a trailer 52 including a plurality of position coordinates (x2, y2) to (x6, y6) between the position coordinates (x0, y0) of the vehicle 110 and the position coordinates (xd, yd) of the parking area, and may generate a travel path 50A of a tractor truck 50 including a plurality of position coordinates (not illustrated) based on the travel path 52A of the trailer 52.

In addition, the controller 124 may transmit, to the vehicle 110, the position coordinates (x0, y0) of the vehicle 110, the position coordinates (xd, yd) of the parking area, the travel path 50A of the tractor truck 50 including the plurality of position coordinates (not illustrated), and the travel path 52A of the trailer 52 including the plurality of position coordinates (x2, y2) to (x6, y6).

Figure 6:
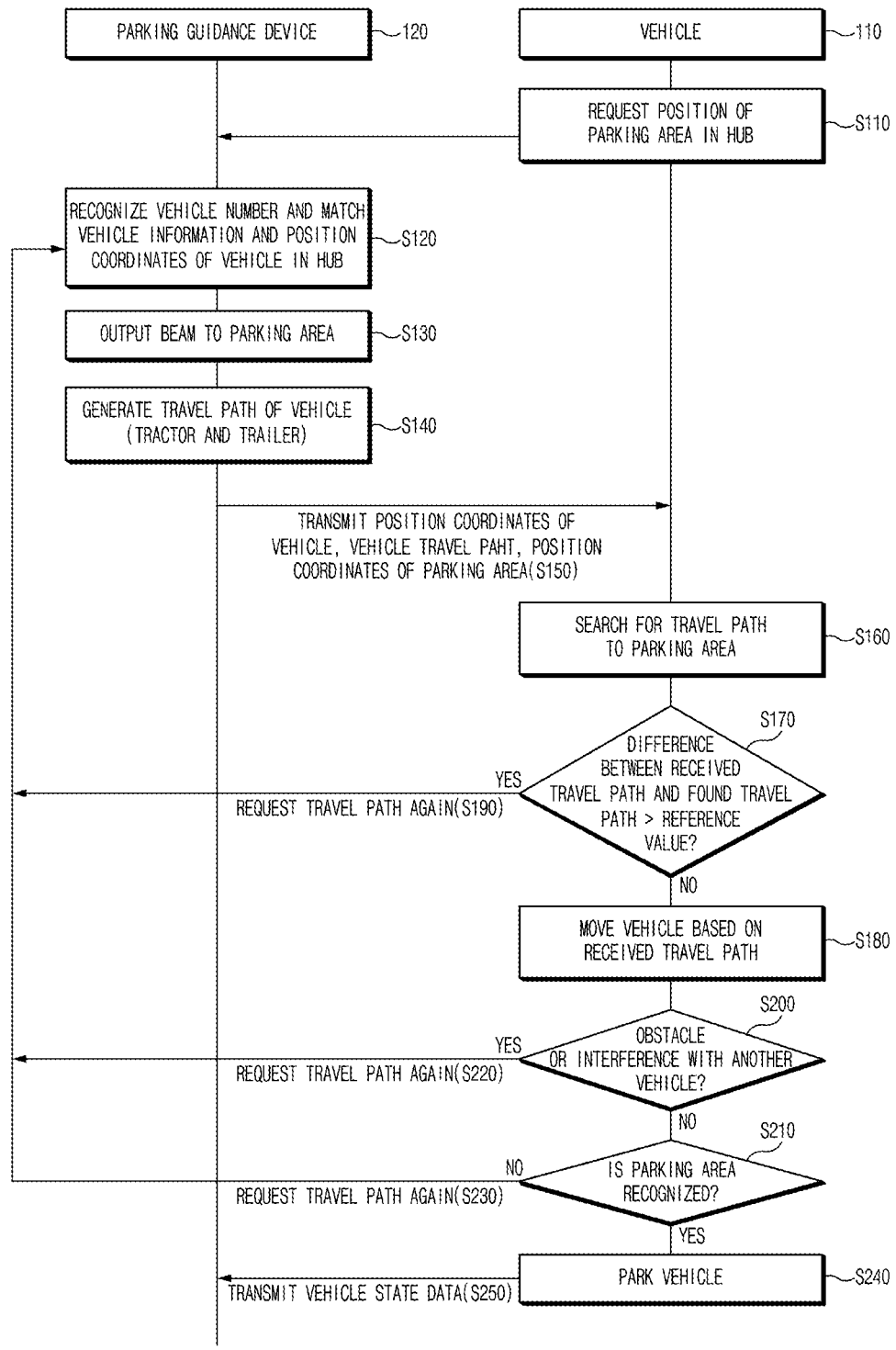
FIG. 6 is a view illustrating a parking guidance method according to an exemplary embodiment of the present disclosure.

FIG. 6 is a view illustrating a parking guidance method according to an exemplary embodiment of the present disclosure.

As illustrated in FIG. 6, the vehicle 110 may request position information of a parking area, in which the vehicle 110 is able to be parked in a distribution hub, from the parking guidance device 120 (S110).

When receiving the request for the position information of the parking area from the vehicle 110, the parking guidance device 120 may recognize the vehicle number through the camera 122 and may match the vehicle information obtained by the camera 122 and the position coordinates of the vehicle 110 in the distribution hub (S120). In S120, the parking guidance device 120 may generate virtual grid lines in the distribution hub and may generate the position coordinates of the vehicle 110 based on the virtual grid lines. In addition, in S120, the parking guidance device 120 may generate the position coordinates of the parking area and may link the position coordinates of the vehicle 110 and the position coordinates of the parking area.

The parking guidance device 120 may output light (a light beam) to the position corresponding to the position coordinates of the parking area linked with the position coordinates of the vehicle 110 and may generate an image capable of being identified as the parking area linked with the vehicle 110 (S130).

The parking guidance device 120 may generate a travel path from the position coordinates of the vehicle 110 to the position coordinates of the parking area (S140). In S140, the parking guidance device 120 may generate a travel path of a trailer including a plurality of position coordinates between the position coordinates of the vehicle 110 (e.g., a tractor truck) and may generate a travel path of a tractor truck including a plurality of position coordinates based on the travel path of the trailer.

The vehicle guidance device 120 may transmit, to the vehicle 110, the position coordinates of the vehicle 110, the position coordinates of the parking area linked with the vehicle 110, the travel path of the tractor truck including the plurality of position coordinates, and the travel path of the trailer including the plurality of position coordinates (S150).

When receiving the position coordinates of the vehicle 110, the position coordinates of the parking area, and the travel path of the vehicle 110 from the parking guidance device 120, the vehicle 110 may search for a travel path of the vehicle 110 to the parking area, based on the received information (S160).

The vehicle 110 may compare the travel path of the vehicle 110 received in S150 and the travel path found in S160 and may determine whether the difference therebetween exceeds a reference value (S170). When it is determined in S170 that the difference between the received travel path and the found travel path does not exceed the reference value (N), the vehicle 110 may control movement to the parking area, based on the travel path received in S150 (S180).

In contrast, when it is determined in S170 that the difference between the received travel path and the found travel path exceeds the reference value (Y), the vehicle 110 may determine that there is an error in the travel path generated by the parking guidance device 120 and may request a travel path from the parking guidance device 120 again (S190).

When the vehicle 110 moves to the parking area based on the received travel path, the vehicle 110 may determine whether interference with another vehicle or an obstacle exists ahead of the vehicle 110 (S200). When it is determined that the interference with the other vehicle or the obstacle exists ahead of the vehicle 110 when the vehicle 110 moves to the parking area based on the received travel path (Y), the vehicle 110 may determine that there is an error in the travel path generated by the parking guidance device 120 and may request a travel path from the parking guidance device 120 again (S230).

In contrast, when there is no obstacle or no interference with another vehicle (N), the vehicle 110 may move along the received travel path. The vehicle 110 may determine whether the parking area is recognized while the vehicle 110 moves along the received travel path (S210). In S210, the vehicle 110 may recognize the image (e.g., 30 of FIG. 3) generated on the ground. The image 30 may include a parking line defining the parking area and may include a form capable of being identified as the parking area.

When the vehicle 110 fails to recognize the image, which is generated to identify the parking area, in S210 during the travel along the received travel path (N), the vehicle 110 may determine that there is an error in the travel path generated by the parking guidance device 120 and may request a travel path from the parking guidance device 120 again (S230). In contrast, when the vehicle 110 recognizes, in S210, the image generated to identify the parking area (Y), the vehicle 110 may perform parking control so as to be parked in the parking area (S240), and when the vehicle 110 is completely parked in the parking area, the vehicle 110 may transmit vehicle state data to the parking guidance device 120 (S250).

Figure 7:
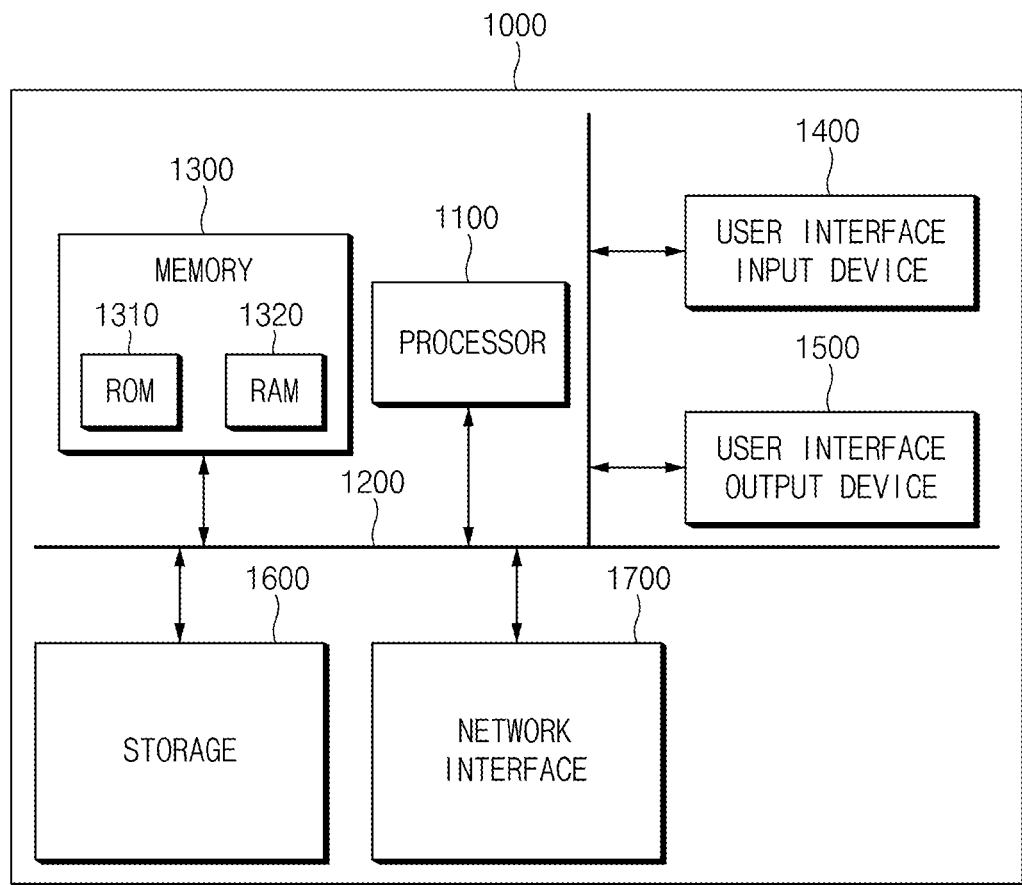
FIG. 7 is a view illustrating a configuration of a computing system for executing a method according to an exemplary embodiment of the present disclosure.

FIG. 7 is a view illustrating a configuration of a computing system for executing a method according to an exemplary embodiment of the present disclosure.

Referring to FIG. 7, the computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The parking guidance system and method according to the embodiments of the present disclosure may support automatic parking of an autonomous truck entering a distribution hub, thereby improving accuracy in parking the autonomous truck. In addition, the parking guidance system and method may automate parking, thereby reducing labor cost and thus reducing cost of transporting freight.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A parking guidance system comprising:
a parking guidance device configured to set a position of a parking area in a distribution hub and to generate a travel path to the parking area; and
an autonomous vehicle configured to control movement of the autonomous vehicle to the position of the parking area set by the parking guidance device,
wherein the parking guidance device includes:
a camera configured to obtain information about the autonomous vehicle;
a communication device configured to transmit at least one of the position of the parking area or the travel path to the parking area to the autonomous vehicle;
a light output device configured to generate an image capable of being identified as the parking area, on a ground corresponding to the position of the parking area; and
a controller configured to link the autonomous vehicle and the position of the parking area to each other.

2. The parking guidance system of claim 1, wherein the autonomous vehicle includes:
a communication device configured to receive the position of the parking area from the parking guidance device; and
a controller configured to recognize the image capable of being identified as the parking area and control the autonomous vehicle to be parked in the parking area.

3. The parking guidance system of claim 1, wherein the autonomous vehicle includes at least one of a tractor truck or a trailer connected with the tractor truck.

4. The parking guidance system of claim 3, wherein the travel path to the parking area includes at least one of a travel path of the trailer or a travel path of the tractor truck generated based on the travel path of the trailer.

5. The parking guidance system of claim 1, wherein the autonomous vehicle receives the position of the parking area from the parking guidance device and searches for a travel path to the parking area based on the position of the parking area received.

6. The parking guidance system of claim 5, wherein the autonomous vehicle compares the travel path received from the parking guidance device and the travel path searched based on the position of the parking area and determines whether a difference between the received travel path and the searched travel path exceeds a reference value.

7. The parking guidance system of claim 6, wherein the autonomous vehicle requests a travel path to the parking area again, upon determining that the difference exceeds the reference value.

8. The parking guidance system of claim 6, wherein the autonomous vehicle controls the movement to the position of the parking area based on the received travel path, upon determining that the difference does not exceed the reference value.

9. The parking guidance system of claim 6, wherein the autonomous vehicle requests a travel path to the parking area again, when an obstacle is detected during the control of the movement to the position of the parking area based on the received travel path.

10. A parking guidance method comprising:
setting, by a parking guidance device, a position of a parking area in a distribution hub and generating a travel path to the parking area; and
controlling movement of an autonomous vehicle to the position of the parking area,
wherein the parking guidance device includes:
a camera configured to obtain information about the autonomous vehicle;
a communication device configured to transmit at least one of the position of the parking area or the travel path to the parking area to the autonomous vehicle;
a light output device configured to generate an image capable of being identified as the parking area, on a ground corresponding to the position of the parking area; and
a controller configured to link the autonomous vehicle and the position of the parking area to each other.

11. The parking guidance method of claim 10, wherein prior to the generating of the travel path, the parking guidance method further comprises:
- obtaining the information about the autonomous vehicle;
- determining the position of the parking area and linking the autonomous vehicle and the position of the parking area to each other; and
- generating the image capable of being identified as the parking area, on the ground corresponding to the position of the parking area.

12. The parking guidance method of claim 10, wherein after the generating of the travel path, the parking guidance method further comprises transmitting at least one of the position of the parking area or the travel path to the parking area to the autonomous vehicle.

13. The parking guidance method of claim 10, wherein the autonomous vehicle includes at least one of a tractor truck or a trailer connected with the tractor truck.

14. The parking guidance method of claim 13, wherein the generating of the travel path to the parking area includes:
- generating a travel path of the trailer and generating a travel path of the tractor truck based on the travel path of the trailer.

15. The parking guidance method of claim 10, further comprising:
- receiving, by the autonomous vehicle, the position of the parking area; and
- searching for a travel path to the parking area based on the position of the parking area.

16. The parking guidance method of claim 15, further comprising:
- comparing, by the autonomous vehicle, the travel path received from the parking guidance device and the travel path searched based on the position of the parking area and determining whether a difference between the received travel path and the searched travel path exceeds a reference value.

17. The parking guidance method of claim 16, further comprising:
- requesting a travel path to the parking area from the parking guidance device again, upon determining that the difference exceeds the reference value.

18. The parking guidance method of claim 16, further comprising:
- controlling the movement of an autonomous vehicle to the parking area based on the received travel path, upon determining that the difference does not exceed the reference value.

19. The parking guidance method of claim 11, wherein the controlling of the movement of the autonomous vehicle to the position of the parking area includes:
- recognizing the image capable of being identified as the parking area and controlling the autonomous vehicle to move to the position of the parking area.

* * * * *